United States Patent [19]

Oguri et al.

[11] Patent Number: 4,490,320

[45] Date of Patent: Dec. 25, 1984

[54] PROCESS FOR PREPARING A CALCIUM SILICATE SHAPED PRODUCT

[75] Inventors: Yasuo Oguri, Tokyo; Mitsuru Awata, Kodaira; Junji Saito, Yokohama; Soichi Inoue, Kawasaki; Noriyuki Ariyama, Hino, all of Japan

[73] Assignee: Mitsubishi Chemical Industries Ltd., Tokyo, Japan

[21] Appl. No.: 454,174

[22] Filed: Dec. 28, 1982

[30] Foreign Application Priority Data

Jan. 27, 1982 [JP]  Japan .................................. 57-11307

[51] Int. Cl.$^3$ .............................................. C04B 15/14
[52] U.S. Cl. ...................................... 264/82; 264/333
[58] Field of Search ................... 264/82, 333; 106/120

[56] References Cited

U.S. PATENT DOCUMENTS 4,193,958  3/1980  Uchida et al. ...................... 264/333

Primary Examiner—Donald Czaja
Assistant Examiner—Mary A. Becker
Attorney, Agent, or Firm—Oblon, Fisher, Spivak, McClelland & Maier

[57] ABSTRACT

A process for preparing a calcium silicate shaped product comprises heat-reacting a calcareous source and a siliceous source dispersed in water to obtain an aqueous slurry containing a calcium silicate hydrate having a molar ratio of $CaO/SiO_2$ being more than 1, adding a siliceous source to the aqueous slurry to bring the molar ratio of $CaO/SiO_2$ to a level of from 0.85 to 1, and pressfilter-molding the aqueous slurry thereby obtained, followed by steam-curing and drying.

15 Claims, No Drawings

PROCESS FOR PREPARING A CALCIUM SILICATE SHAPED PRODUCT

The present invention relates to a process for preparing a calcium silicate shaped product. More particularly, it relates to a process for preparing a calcium silicate shaped product composed mainly of xonotlite and having a low bulk density and excellent flame and heat resistance, mechanical strength and dimensional stability, which is thus suitable as a lagging material, a flame and heat resistant material and a heat insulator.

A calcium silicate shaped product, especially the one composed mainly of xonotlite, undergoes a topotactic transformation from xonotlite ($6CaO.6SiO_2.H_2O$) to wollastonite ($CaO.SiO_2$) at a temperature of 750° to 800° C. and thus has a small coefficient of linear thermal shrinkage and excellent heat resistance, and accordingly it is suitable as a heat insulator, a heat resistant material or a flame resistant material.

However, when used at a high temperature at a level of about 1000° C., xonotlite undergoes a topotactic transformation to wollastonite as mentioned above, whereupon wollastonite crystals tend to undergo fusion, thus leading to a drawback that the strength after the heating tends to be poor.

As a result of extensive researches to overcome the drawback, the present inventors have found that it is possible to consistently prepare a shaped product which shows a minimum decrease in its strength even when used at a temperature as high as 1000° C., by incorporating a siliceous source into an aqueous slurry containing a calcium silicate hydrate having a molar ratio of $CaO/SiO_2$ being more than 1, to bring the molar ratio of $CaO/SiO_2$ to a level of from 0.85 to 1 and pressfilter-molding the aqueous slurry thus obtained, followed by steam curing and drying. The present invention has been accomplished based on this discovery.

It is an object of the present invention to provide a process for preparing a calcium silicate shaped product having a low bulk density and good flame resistance, heat resistance, mechanical strength and dimensional stability.

The present invention provides a process for preparing a calcium silicate shaped product, which comprises heat-reacting a calcareous source and a siliceous source dispersed in water to obtain an aqueous slurry containing a calcium silicate hydrate having a molar ratio of $CaO/SiO_2$ being more than 1, adding a siliceous source to the aqueous slurry to bring the molar ratio of $CaO/SiO_2$ to a level of from 0.85 to 1, and pressfilter-molding the aqueous slurry thereby obtained, followed by steam-curing and drying.

Now, the present invention will be described in further detail.

According to the present invention, firstly a calcareous source and a siliceous source dispersed in water are reacted under heating to obtain an aqueous slurry containing a calcium silicate hydrate, preferably a calcium silicate hydrate composed of a tobermorite group compound having a wet volume of at least 15 cm³/g.

As the silicious source, there may be mentioned natural sources such as diatomaceous earth and ground quartzite; silicon dust; and industrial by-products such as ground quartzite obtained by reacting aluminum hydroxide with hydrosilicofluoric acid formed as a by-product in a wet process for producing phosphoric acid (hereinafter referred to as a by-product ground quartzite of wet phosphoric acid process).

As the calcareous source, there may be used conventional sources such as calcium oxide, calcium hydroxide and carbide water.

In order to obtain a calcium silicate composed mainly of xonotlite, the molar ratio of the calcareous source to the siliceous source ($CaO/SiO_2$) is usually selected within a range of from 0.8 to 1.2. If the molar ratio is less than 1.0, formation of 11 Å tobermorite is likely to be facilitated and it becomes difficult to control the reaction. Once such tobermorite has been formed, it takes a considerably long period of time for the transformation to xonotlite, and such a process is not feasible for industrial operation. Accordingly, the molar ratio of $CaO/SiO_2$ is selected to be more than 1, preferably from 1.0 to 1.2, more preferably from 1.0 to 1.1.

The amount of water in which both sources are dispersed, is at least 15 times by weight, preferably from 17 to 40 times by weight, the solid source components.

The sources dispersed in water are reacted under heating usually at a temperature of from 80° to 230° C. for from 30 minutes to 10 hours, whereupon an aqueous slurry containing the calcium silicate hydrate is obtainable.

Calcium silicate hydrates are generally classified in accordance with the classification described in The Chemistry of Cements (editated by H. F. W. Taylor), Vol. I, page 182, Table II. The calcium silicate hydrate to be used in the present invention may be any tobermorite group compound selected from the group consisting of tobermorite gel, C—S—H (II) and C—S—H (I). The calcium silicate hydrate usually undergoes transformation in the order of tobermorite gel→C—S—H (II)→C—S—H (I)→xonotlite. Accordingly, the desired crystals may readily be obtained simply by controlling the reaction temperature and time. Namely, if the reaction temperature is raised or if the reaction time is prolonged, the transformation proceeds in the direction shown by the arrow (→). According to the present invention, the tobermorite group compound is produced by reacting the calcareous source and the siliceous source. The desired tobermorite group compound is obtainable by selecting the reaction temperature and time within the above ranges. If the reaction temperature is excessively high or if the reaction time is excessively long, xonotlite is likely to form. In such a case, the temperature may be lowered or the reaction time may be shortened.

In the present invention, it is preferred that the calcium silicate hydrate in the aqueous slurry has a wet volume of at least 15 cm³/g.

The wet volume here is meant for a value calculated by the following equation (I):

$$\text{Wet volume} = \frac{V}{W} \quad (I)$$

where W is a total weight of the starting materials (i.e. the calcareous source and the siliceous source) and V is a volume of solid components precipitated by sedimentation of the aqueous slurry for 24 hours after the reaction. In practice, the wet volume is obtained as follows. Firstly, $W_1$ g of the aqueous slurry is sampled from a total weight of $W_0$ g of the slurry obtained by the reaction and put into a measuring cylinder, and it is kept to stand still for 24 hours, whereupon the volume $V_1$ of the precipitated solid components was measured. Then, the wet volume is calculated by the following equation (II):

$$\text{Wet volume} = \frac{V_1}{W_1 \times \frac{W}{W_0}} \quad (II)$$

where W is a total weight of the starting materials as defined above.

In order to obtain a wet volume of at least 15 cm$^3$/g, the reaction is carried out, for instance, at a temperature of at least 130° C., preferably from 150° to 230° C., more preferably from 160° to 210° C., under stirring. It is necessary to maintain the reaction system in a liquid state, and therefore, the reaction is usually carried out under higher pressure.

The slurry thus prepared is preferably admixed with a reinforcing fiber in accordance with a conventional manner. As the reinforcing fiber, there may be used various types of conventional fibers such as asbestos, rock wool and glass fiber, and the one having excellent heat resistance is preferred. The reinforcing fiber is incorporated in an amount such that it constitutes from 0.5 to 10% by weight in the final shaped product.

According to the present invention, a siliceous source is then added to bring the molar ratio of CaO/SiO$_2$ to a level of from 0.85 to 1.00. The siliceous source may be crystalline or amorphous and may be for instance the same materials as mentioned above, i.e. natural sources such as diatomaceous earth and ground quartzite; silicon dust; and industrial by-products such as a by-product ground quartzite of wet phosphoric acid process. If the molar ratio of CaO/SiO$_2$ is lower than 0.85, the major component tends to be tobermorite, and when heated at a high temperature of at least 1,000° C., such a product undergoes shrinkage to a great extent. On the other hand, if the molar ratio is greater than 1.00, fusion of wollastonite crystals is likely to take place thus leading to a substantial decrease in the strength after the heating.

The slurry thus treated is then passed for filterpress-molding. This filterpress-molding can be done by a usual press molding machine and no special means is required. For this operation, the temperature and pressure are usually within ranges of from 30° to 80° C. and from 1 to 200 kg/cm$^2$ G (G represents gauge pressure and the same applies hereinafter), respectively. The adjustment of the bulk density of the shaped product can be done by controlling the amount of the slurry and the piston stroke of the press molding machine.

Then, the shaped product thus prepared is subjected to steam curing, i.e. so-called autoclave curing, under pressure in the conventional manner. By this steam curing, the calcium silicate hydrate, i.e. tobermorite gel, C—S—H (I) or C—S—H (II) will be transformed into xonotlite. By this transformation of the crystals by means of the steam curing, a shaped product having a low bulk density and superior mechanical strength will be obtained. In this steam curing operation, the higher the steam pressure is, the shorter the reaction time can be made. It is usually preferred, however, that the steam pressure is from 5 to 50 kg/cm$^2$ G, more preferably from 10 to 20 kg/cm$^2$ G. The mechanism under which the effect of the present invention is obtainable, is not clearly understood. However, it is considered that the reaction of the calcium silicate hydrate (i.e. tobermorite or C—S—H) with the siliceous source is a solid-liquid reaction where C—S—H reacts in its undissolved state with the silicic acid ions, whereby the reaction is stabilized, calcium silicate having uniform quality is readily obtained in a short period of time and the crystals do not fuse even when heated at a temperature as high as 1,000° C.

Now, the present invention will be described in further detail with reference to Examples. In the following Examples and Comparative Examples, "part(s)" and "%" mean "part(s) by weight" and "% by weight", respectively.

EXAMPLES 1 TO 4

Warm water was added to 49.6 parts of quick lime (96.2% of CaO) for slaking, and 50.4 parts of ground quartzite (96.4% of SiO$_2$) was added to bring the molar ratio of CaO/SiO$_2$ to be 1.05. Then, water was added to bring the total amount of water to be 27.5 times by weight relative to the solid components. The suspension thus obtained was stirred and reacted in an autoclave for 2 hours at 200° C. under pressure of 15 kg/cm$^2$ G, whereupon an aqueous slurry containing C—S—H (I) having a wet volume of 21 cm$^3$/g was obtained. To this aqueous slurry, 3 parts of alkali resistant glass fiber and ground quartzite (96.4% of SiO$_2$) in an amount to bring the molar ratio of CaO/SiO$_2$ to be 1.00 (Example 1), 0.95 (Example 2), 0.90 (Example 3) and 0.85 (Example 4), respectively, were added. The slurry was adjusted to bring the bulk density to be 0.10 and press filtered to form a shaped product having a size of 300×300×50 mm (length, width and thickness, respectively).

Then, the shaped product was subjected to steam curing in an autoclave under steam pressure of 11 kg/cm$^2$ G at 187° C. and finally dried at 150° C. for 8 hours.

The shaped product thus prepared was heated in an electric furnace at 1,000° C. for 24 hours, and after cooling it, the shrinkage and compressive strength thereof were measured. The results thereby obtained are shown in Table 1.

COMPARATIVE EXAMPLE 1

To a slurry of calcium silicate hydrate prepared in the same manner as in Example 1, 3 parts of alkali resistant glass fiber was added without addition of the ground quartzite for adjustment of the molar ratio of CaO/SiO$_2$, and then the slurry was adjusted to bring the bulk density to be 0.10 and press filtered to form a shaped product having a size of 300×300×50 mm. The shaped product was subjected to steam curing and drying in the same manner as in Example 1.

The shaped product thus obtained was heated at 1,000° C. for 24 hours, and after cooling it, the shrinkage and compressive strength thereof were measured. The results thereby obtained are shown in Table 1.

COMPARATIVE EXAMPLE 2

To a calcium silicate hydrate prepared in the same manner as in Example 1, ground quartzite was added in the same manner as in Example 1 except that its amount was adjusted to bring the molar ratio of CaO/SiO$_2$ to be 0.80. Thereafter, the press filtration for shaping and the steam curing were conducted in the same manner as in Example 1, whereupon a calcium silicate shaped product was obtained. The physical properties of the shaped product are shown in Table 1.

COMPARATIVE EXAMPLE 3

Warm water was added to 53 parts of quick lime (96.2% of CaO) for slaking, and 47 parts of ground quartzite (96.4% of $SiO_2$) was added to bring the molar ratio of $CaO/SiO_2$ to be 1.20. Then, water was added to bring the total amount of water to be 27.5 times by weight relative to the solid components. The suspension thereby obtained was stirred and reacted in an autoclave for 2.25 hours at 200° C. under pressure of 15 kg/cm² G, whereupon an aqueous slurry containing C—S—H (I) having a wet volume of 22 cm³/g was obtained. To this aqueous slurry, 3 parts of alkali resistant glass fiber was added without addition of the ground quartzite for adjustment of the molar ratio of $CaO/SiO_2$. Thereafter, the same operation as in Example 1 was conducted to obtain a dried shaped product. This shaped product was heated at 1,000° C. for 24 hours, and after cooling it, the shrinkage and compressive strength thereof were measured. The results thereby obtained are shown in Table 1.

EXAMPLES 5 TO 7

To the aqueous slurry having a molar ratio of $CaO/SiO_2$ of 1.20 as prepared in Comparative Example 3, 3 parts of alkali resistant glass fiber and ground quartzite (Example 5), diatomaceous earth (Example 6) or silicon dust (Example 7) in an amount to bring the molar ratio of $CaO/SiO_2$ to be 0.90, were added, and the slurry was subjected to press filtration for shaping to bring the bulk density to be 0.10. Therefore, the steam curing and drying were carried out in the same manner as in Example 1, whereupon a shaped product was obtained.

The shaped product was heated at 1,000° C. for 24 hours, and then the physical properties thereof were measured. The results thereby obtained are shown in Table 1.

TABLE 1

| | Molar ratio of $CaO/SiO_2$ | Siliceous source added | Compressive strength under normal condition (kg/cm²) | After heating at 1000° C. for 24 hours | |
|---|---|---|---|---|---|
| | | | | Shrinkage (%) | Compressive strength (kg/cm²) |
| Example 1 | 1.00 | Silica | 6.2 | 1.0 | 2.3 |
| Example 2 | 0.95 | " | 6.4 | 1.2 | 3.5 |
| Example 3 | 0.90 | " | 6.1 | 1.4 | 4.5 |
| Example 4 | 0.85 | " | 6.5 | 1.4 | 4.7 |
| Comparative Example 1 | 1.05 | None | 6.7 | 1.0 | 1.0 |
| Comparative Example 2 | 0.80 | Silica | 6.3 | 2.8 | 4.5 |
| Comparative Example 3 | 1.20 | None | 5.8 | 1.5 | 0.2 |
| Example 5 | 0.90 | Silica | 6.0 | 1.3 | 4.8 |
| Example 6 | 0.90 | Diatomaceous earth | 5.0 | 1.9 | 4.0 |
| Example 7 | 0.90 | Silicon dust | 5.2 | 1.5 | 4.3 |

The above Examples are intended only for illustration of the typical embodiments of the present invention and should not be regarded as limiting the present invention. Various changes and modifications may be made within the scope of the present invention.

We claim:

1. A process for preparing a calcium silicate shaped product, which comprises:
   heat-reacting a calcareous source and a siliceous source dispersed in water to obtain an aqueous slurry containing a calcium silicate hydrate having a molar ratio of $CaO/SiO_2$ greater than 1; adding a siliceous source to the aqueous slurry to bring the molar ratio of $CaO/SiO_2$ to a level of from 0.85 to 1; pressfilter-molding the aqueous slurry thereby obtained, and then steam-curing and drying the object obtained from the molding step.

2. The process according to claim 1 wherein the proportions of the calcareous source and the siliceous source dispersed in water for the heat of reaction is chosen to bring the molar ratio of $CaO/SiO_2$ to within a range of from 1.0 to 1.2.

3. The process according to claim 1 wherein the proportions of the calcareous source and the siliceous source dispersed in water for the heat of reaction is chosen to bring the molar ratio of $CaO/SiO_2$ to within a range of from 1.0 to 1.1.

4. The process according to claim 1 wherein the amount of water in which the calcareous source and the sliceous source are dispersed is at least 15 times by weight the solid source components.

5. The process according to claim 1 wherein the amount of water in which the calcareous source and the siliceous source are dispersed is from 17 to 40 times by weight the solid source components.

6. The process according to claim 1 wherein the calcareous and siliceous sources dispersed in water are reacted at a temperature of from 80° to 230° C. for from 30 minutes to 10 hours.

7. The process according to claim 1 wherein the calcium silicate hydrate in the aqueous slurry has a wet volume of at least 15 cm³/g.

8. The process according to claim 1 wherein the calcareous and siliceous sources dispersed in water and stirred are reacted at a temperature of from 150° C. to 230° C.

9. The process according to claim 1 wherein the calcareous and siliceous sources dispersed in water and stirred are reacted at a temperature of from 160° to 210° C.

10. The process according to claim 1 wherein a reinforcing fiber is added to the aqueous slurry before the pressfilter-molding, so that the reinforcing fiber constitutes from 0.5 to 10% by weight in the final shaped product.

11. The process according to claim 10 wherein the reinforcing fiber is asbestos, rock wool or glass fiber.

12. The process according to claim 1 wherein the pressfilter-molding of the aqueous slurry is conducted at a temperature of from 30° to 80° C. under a pressure of from 1 to 200 kg/cm² G.

13. The process according to claim 1 wherein the steam curing is conducted under steam pressure of from 5 to 50 kg/cm² G.

14. The process according to claim 1 wherein the steam curing is conducted under steam pressure of from 10 to 20 kg/cm² G.

15. The process according to claim 1, wherein the silicious source is selected from the group consisting of diatomaceous earth, natural ground quartzite, silicon dust and by-product ground quartzite obtained from the wet phosphoric acid process, and the calcareous source is selected from the group consisting of calcium oxide, calcium hydroxide and carbide waste.

* * * * *